US011400805B2

(12) United States Patent
Fukui et al.

(10) Patent No.: US 11,400,805 B2
(45) Date of Patent: Aug. 2, 2022

(54) REFUELING CONTROL SYSTEM FOR INTERNAL COMBUSTION ENGINE

(71) Applicants: TOYOTA JIDOSHA KABUSHIKI KAISHA, Toyota (JP); AISAN KOGYO KABUSHIKI KAISHA, Obu (JP)

(72) Inventors: Keita Fukui, Fujinomiya (JP); Makoto Yamazaki, Gotemba (JP); Yoshikazu Miyabe, Obu (JP)

(73) Assignees: Toyota Jidosha Kabushiki Kaisha, Toyota (JP); Aisan Kogyo Kabushiki Kaisha, Obu (JP)

( * ) Notice: Subject to any disclaimer, the term of this patent is extended or adjusted under 35 U.S.C. 154(b) by 344 days.

(21) Appl. No.: 16/797,044

(22) Filed: Feb. 21, 2020

(65) Prior Publication Data
US 2020/0269680 A1     Aug. 27, 2020

(30) Foreign Application Priority Data
Feb. 25, 2019    (JP) .............................. JP2019-031630

(51) Int. Cl.
*B60K 15/035*    (2006.01)
*B60K 15/04*     (2006.01)

(52) U.S. Cl.
CPC .... *B60K 15/03519* (2013.01); *B60K 15/0406* (2013.01); *B60K 2015/03523* (2013.01)

(58) Field of Classification Search
CPC .......... B60K 15/03519; B60K 15/0406; B60K 2015/03523

USPC ........................................................... 701/49
See application file for complete search history.

(56) References Cited

U.S. PATENT DOCUMENTS

| 2011/0203554 A1* | 8/2011 | Horiba ............... F02M 25/0836 |
| | | 73/114.77 |
| 2017/0292477 A1 | 10/2017 | Kimoto et al. |
| 2018/0264937 A1 | 9/2018 | Fukui et al. |

FOREIGN PATENT DOCUMENTS

| CN | 106795834 A | 5/2017 |
| JP | 2018-150901 | 9/2018 |
| WO | WO 2016/035655 | 3/2016 |

* cited by examiner

*Primary Examiner* — Mahmoud Gimie
(74) *Attorney, Agent, or Firm* — Finnegan, Henderson, Farabow, Garrett & Dunner, LLP

(57) ABSTRACT

A refueling control system for an internal combustion engine includes a fuel tank; a vapor pipe; a step motor-driven shut-off valve; a fuel filler lid; and an electronic control unit configured to, when the fuel filler lid is to be opened, i) drive the shut-off valve such that the shut-off valve is opened, ii) close the fuel filler lid when an opening degree of the shut-off valve is less than a set opening degree, and iii) open the fuel filler lid when the opening degree of the shut-off valve is greater than or equal to the set opening degree. The electronic control unit sets the set opening degree such that the set opening degree when an opening speed of the shut-off valve is low is greater than the set opening degree when the opening speed of the shut-off valve is high.

4 Claims, 5 Drawing Sheets

REFUELING CONTROL SYSTEM FOR INTERNAL COMBUSTION ENGINE

CROSS-REFERENCE TO RELATED APPLICATION

This application claims priority to Japanese Patent Application No. 2019-031630 filed on Feb. 25, 2019, incorporated herein by reference in its entirety.

BACKGROUND

1. Technical Field

The disclosure relates to a refueling control system for an internal combustion engine.

2. Description of Related Art

There is a refueling control system for an internal combustion engine, which includes a fuel tank, a vapor passage communicating with a gas region inside the fuel tank, a step motor-driven shut-off valve disposed in the vapor passage, and a lid door that is opened or closed by a lid opener (see, for example, WO 2016/035655). In the refueling control system, when a fuel filler switch for opening the lid door is operated, the shut-off valve is opened, subsequently, when the pressure in the fuel tank becomes lower than or equal to a predetermined value, a control signal is output to the shut-off valve such that the amount of opening of the shut-off valve is increased to a predetermined amount C, and then the lid opener is controlled to open the lid door (for example, paragraph 0042, and the like).

SUMMARY

However, when the opening speed of the shut-off valve is low due to, for example, the reason that a battery voltage for driving the shut-off valve is low, refueling may be started in a state where the amount of opening of the shut-off valve is not large. In this case, gas in the fuel tank may not smoothly flow out to the outside of the fuel tank via the shut-off valve during refueling, and the pressure in the fuel tank may excessively increase. As a result, it may be difficult for fuel to flow into the fuel tank, that is, refueling may not be performed smoothly.

An aspect of the disclosure relates to a refueling control system for an internal combustion engine. The refueling control system includes a fuel tank; a vapor pipe communicating with a gas region inside the fuel tank; a shut-off valve disposed in the vapor pipe, the shut-off valve being configured to be driven by a step motor; a fuel filler lid configured to be opened and closed by an actuator; and an electronic control unit configured to, when the fuel filler lid is to be opened, i) drive the shut-off valve such that the shut-off valve is opened to a target opening degree that is set in advance, ii) close the fuel filler lid by controlling the actuator when an opening degree of the shut-off valve is less than a set opening degree that is set in advance, and iii) open the fuel filler lid by controlling the actuator when the opening degree of the shut-off valve is greater than or equal to the set opening degree. The electronic control unit is configured to set the set opening degree such that the set opening degree when an opening speed of the shut-off valve is low is greater than the set opening degree when the opening speed of the shut-off valve is high.

Not only when the opening speed of the shut-off valve is low but also when the opening speed of the shut-off valve is high, refueling can be smoothly performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
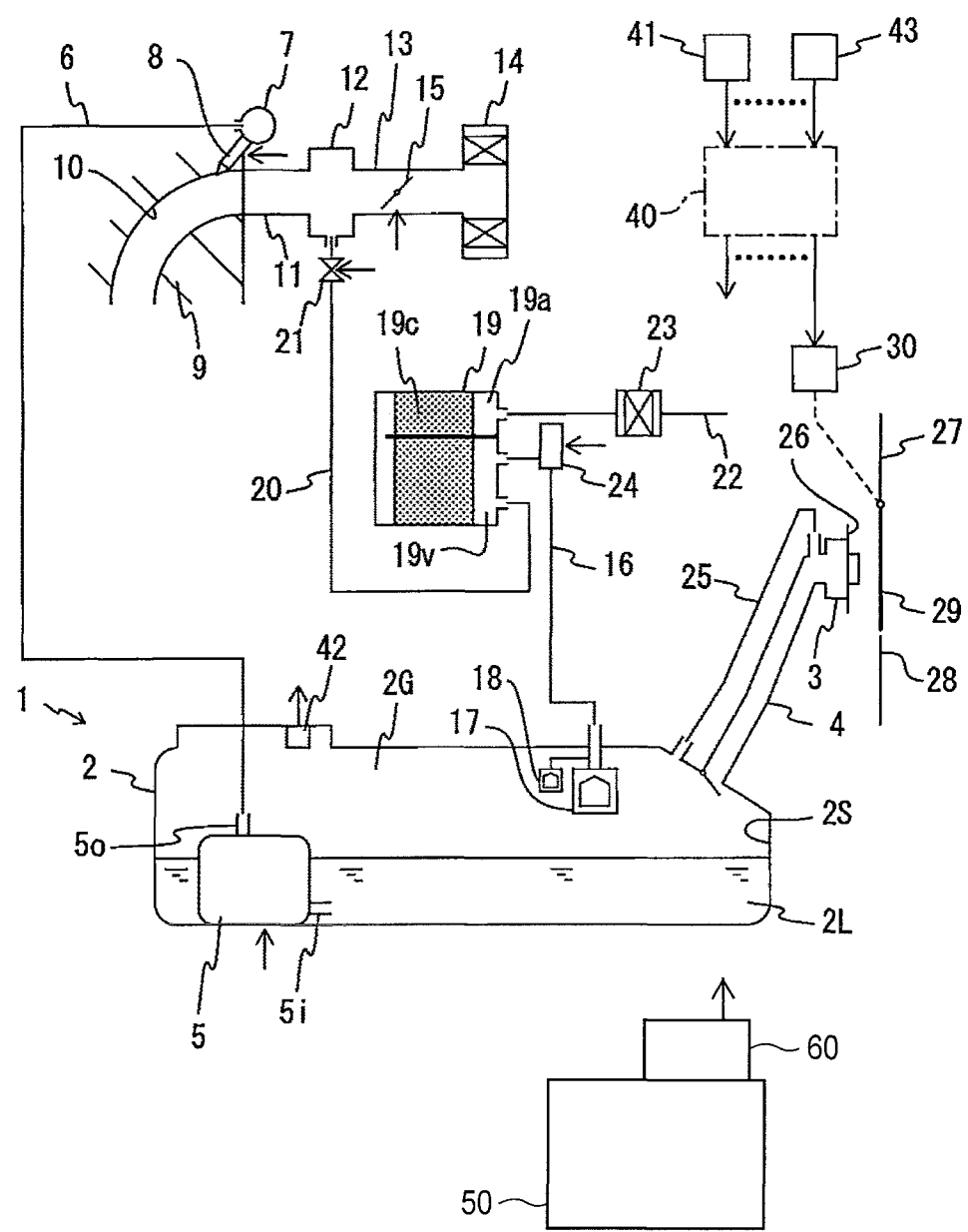
FIG. 1 is a schematic general view of an internal combustion engine according to an embodiment of the disclosure.

As shown in FIG. 1, a refueling control system 1 for an internal combustion engine according to an embodiment of the disclosure includes a fuel tank 2. The fuel tank 2 according to the embodiment of the disclosure has an internal space 2S and is configured to store liquid fuel in the internal space 2S. In other words, a fuel filler pipe 4 that reaches a fuel inlet 3 communicates with the internal space 2S of the fuel tank 2. When refueling is performed, that is, when liquid fuel is supplied into the internal space 2S via the fuel filler pipe 4, a liquid region 2L occupied by liquid fuel is formed at the lower side of the internal space 2S. On the other hand, a gas region 2G occupied by gas, that is, evaporated fuel and air, is formed at the upper side of the internal space 2S. Examples of liquid fuel include gasoline, light oil, and alcohol.

In the embodiment according to the disclosure, a fuel pump 5 that pumps liquid fuel inside the fuel tank 2 (i.e., a fuel pump 5 that delivers the liquid fuel from the fuel tank 2) is accommodated in the internal space 2S of the fuel tank 2. An inlet 5i of the fuel pump 5 communicates with the liquid region 2L of the fuel tank 2. An outlet 5o of the fuel pump 5 is coupled to a fuel injection valve 8 sequentially via a fuel supply pipe 6 and a common rail 7. The fuel injection valve 8 according to the embodiment of the disclosure is connected to a cylinder head 9 of an engine body and is configured to inject fuel into an intake port 10. In another embodiment (not shown), the fuel injection valve 8 is configured to inject fuel into a combustion chamber (not shown).

The intake port 10 according to the embodiment of the disclosure is coupled to a surge tank 12 via an intake branch pipe 11. The surge tank 12 is coupled to an air cleaner 14 via an intake supply pipe 13. A throttle valve 15 is disposed in the intake supply pipe 13.

The refueling control system 1 according to the embodiment of the disclosure further includes a vapor pipe 16 that communicates with the gas region 2G of the fuel tank 2. The vapor pipe 16 according to the embodiment of the disclosure communicates with the gas region 2G via a float-type Onboard Refueling Vapor Recovery (ORVR) valve 17 and a cut off valve 18. The vapor pipe 16 of another embodiment (not shown) communicates with the gas region 2G without passing through one or both of the ORVR valve and the cut off valve.

The vapor pipe 16 according to the embodiment of the disclosure is coupled to a canister 19 configured to temporarily store evaporated fuel. The canister 19 according to the embodiment of the disclosure includes an adsorption layer 19c containing, for example, activated carbon, a vapor chamber 19v located on one side of the adsorption layer 19c, and an air chamber 19a located on the other side of the adsorption layer 19c. The vapor pipe 16 according to the embodiment of the disclosure communicates with the vapor chamber 19v. The vapor chamber 19v according to the embodiment of the disclosure further communicates with, for example, the surge tank 12 via a purge pipe 20. An electromagnetic purge control valve 21 is disposed in the purge pipe 20. On the other hand, the air chamber 19a according to the embodiment of the disclosure communicates with the atmosphere via an air pipe 22. An air filter 23 is disposed in the air pipe 22 according to the embodiment of the disclosure.

Figure 2:
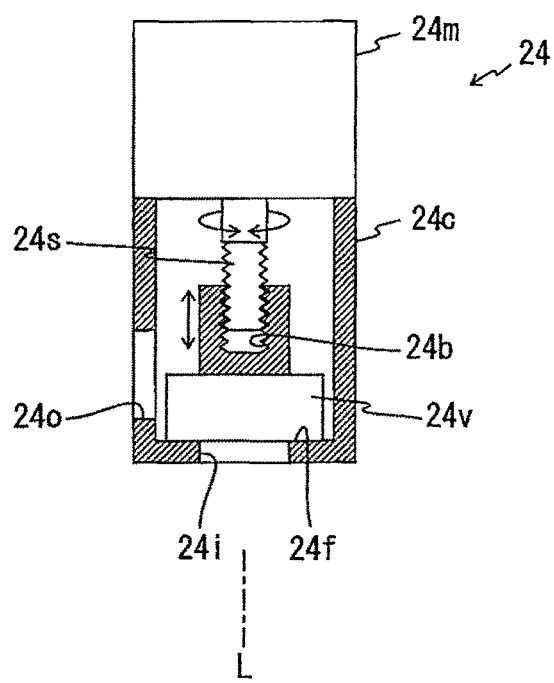
FIG. 2 is a schematic partial sectional view of a shut-off valve according to the embodiment of the disclosure.

A step motor-driven shut-off valve (i.e., a shut-off valve configured to be driven by a step motor) 24 is provided in the vapor pipe 16 according to the embodiment of the disclosure. An example of the shut-off valve 24 is shown in FIG. 2. In the example shown in FIG. 2, the shut-off valve 24 includes a casing 24c, a step motor 24m, and a valve element 24v. The casing 24c has an inlet 24i and an outlet 24o. The inlet 24i communicates with the fuel tank 2. The outlet 24o communicates with the canister 19. The step motor 24m includes a threaded output shaft 24s rotatable around a central axis L. The valve element 24v is provided inside the casing 24c so as to be movable in the direction of the central axis L and non-rotatable around the central axis L. The output shaft 24s is screwed to a threaded hole 24b of the valve element 24v.

When the step motor 24m is driven such that the number of steps increases, the valve element 24v separates (i.e., moves away) from a seal surface 24f, and the inlet 24i is opened. In other words, the shut-off valve 24 is opened. As the number of steps further increases, the valve element 24v is further moved away from the seal surface 24f. In other words, the opening degree of the shut-off valve 24 is increased. In contrast to this, when the number of steps is reduced and the valve element 24v contacts the seal surface 24f, the inlet 24i is closed. In other words, the shut-off valve 24 is closed. In this way, the number of steps of the step motor 24m represents the opening degree of the shut-off valve 24. The step motor 24m according to the embodiment of the disclosure is driven by using electric power from a battery 50.

In the embodiment according to the disclosure, during a stop of the internal combustion engine, the shut-off valve 24 is opened, and the purge control valve 21 is closed. As a result, evaporated fuel in the gas region 2G of the fuel tank 2 flows into the vapor chamber 19v of the canister 19 via the vapor pipe 16 together with air in the gas region 2G, subsequently reaches the adsorption layer 19c and is adsorbed by the adsorption layer 19c. On the other hand, during operation of the internal combustion engine, when the purge control valve 21 is opened, air flows into the air chamber 19a of the canister 19 via the air pipe 22 under negative pressure that is generated inside the surge tank 12, and subsequently passes through the adsorption layer 19c. At this time, evaporated fuel is desorbed from the adsorption layer 19c. The evaporated fuel is supplied together with air into the surge tank 12 via the vapor chamber 19v, the purge pipe 20, and the purge control valve 21, and is burned in the combustion chamber together with fuel from the fuel injection valve 8. Also, during operation of the internal combustion engine, evaporated fuel flowing from the vapor pipe 16 into the vapor chamber 19v flows out into the purge pipe 20 without being adsorbed to the adsorption layer 19c.

Referring to FIG. 1 again, in the embodiment according to the disclosure, a breather pipe 25 that couples the gas region 2G and the fuel filler pipe 4 around the fuel inlet 3 to each other is provided. The breather pipe 25 is useful in, during refueling, releasing (i.e., discharging) gas from the gas region 2G and causing liquid fuel to quickly flow into the internal space 2S of the fuel tank 2.

A fuel filler cap 26 is provided at the fuel inlet 3 according to the embodiment of the disclosure. In the embodiment according to the disclosure, an opening 28 is formed in a vehicle body 27 facing the fuel filler cap 26, and the opening 28 is usually closed by a fuel filler lid 29. The fuel filler lid 29 according to the embodiment of the disclosure is configured to be opened or closed by an actuator 30.

The refueling control system 1 according to the embodiment of the disclosure further includes an electronic control unit 40. The electronic control unit 40 according to the embodiment of the disclosure includes one or plurality of computers. Each of the one or plurality of computers includes a central processing unit (CPU), a read only memory (ROM), a random access memory (RAM), an input port, an output port, and the like, which are connected by a bidirectional bus to each another.

A sensor 41 is connected to the input port of the electronic control unit 40 according to the embodiment of the disclosure. The sensor 41 includes a pressure sensor 42 configured to detect a tank pressure that is the pressure in the fuel tank 2, a voltage sensor 60 configured to detect the voltage of the battery 50, and the like. A fuel filler switch 43 is further connected to the input port according to the embodiment of the disclosure. The fuel filler switch 43 is operated by an operator (for example, a driver of a vehicle) when refueling is performed. On the other hand, the output port of the electronic control unit 40 according to the embodiment of the disclosure is connected to the fuel pump 5, the fuel injection valve 8, the throttle valve 15, the purge control valve 21, the actuator 30, and the like.

Next, refueling control according to the embodiment of the disclosure will be described in detail. In the embodiment according to the disclosure, when the fuel filler switch 43 is turned on by the operator for refueling, the shut-off valve 24 is driven so as to be opened to a predetermined target opening degree (i.e., a target opening degree that is set in advance). In other words, the shut-off valve 24 or the step motor 24m is driven such that the number of steps of the step motor 24m is increased to a target number of steps corresponding to the target opening degree.

Figure 3:
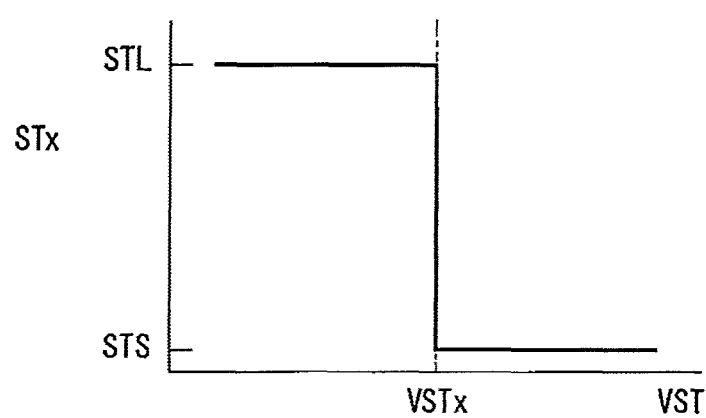
FIG. 3 is a line chart that shows a set number of steps STx according to the embodiment of the disclosure.

In the embodiment according to the disclosure, subsequently, it is determined (i.e., the electronic control unit 40 determines) whether a tank pressure P is lower than or equal to a predetermined set pressure Px (i.e., a set pressure Px that is set in advance). When P is lower than or equal to Px (P≤Px) or when P becomes lower than or equal to Px (P≤Px), a set number of steps is set based on the opening speed of the shut-off valve 24, that is, the step increase rate (i.e., the rate of increase in the number of steps) of the step motor 24m. FIG. 3 shows a set number of steps STx according to the embodiment of the disclosure. In the example shown in FIG. 3, when the step increase rate VST is lower than a predetermined set rate VSTx (i.e., a set rate VSTx that is set in advance), the set number of steps STx is set to a relatively large set number of steps STL. In contrast to this, when the step increase rate VST is higher than or equal to the predetermined set rate VSTx, the set number of steps STx is set to a relatively small set number of steps STS (for example, zero). In another embodiment (not shown), the set number of steps STx is set so as to increase with a decrease in the step increase rate VST.

As described above, the step motor 24*m* of the shut-off valve 24 is driven by using electric power supplied from the battery 50. Therefore, a battery voltage represents the step increase rate of the shut-off valve 24 or an opening speed of the shut-off valve 24. In the embodiment according to the disclosure, it is determined that the step increase rate VST is lower than the predetermined set rate VSTx when a detected battery voltage is lower than a predetermined set voltage (i.e., a set voltage that is set in advance), and it is determined that the step increase rate VST is higher than or equal to the predetermined set rate VSTx when a detected battery voltage is higher than or equal to the predetermined set voltage. The method for detecting (determining) the opening speed of the shut-off valve is not limited to the above-mentioned method. For example, the physical position of a valve element of the shut-off valve may be directly detected with the use of a known electromagnetic sensor, a known optical sensor, a known mechanical sensor or the like, and the opening speed of the shut-off valve may be detected (determined) based on a change in the position of the valve element. Thus, various techniques may be employed to detect the opening speed of the shut-off valve.

Subsequently, it is determined whether the number of steps ST is greater than or equal to the set number of steps STx. When the number of steps ST is less than the set number of steps STx, the fuel filler lid 29 is kept closed. When the number of steps ST is greater than or equal to the set number of steps STx, the fuel filler lid 29 is opened. The number of steps ST can be detected (determined) by multiplying the step increase rate VST by time. However, the method for detecting (determining) the number of steps is not limited to this method. For example, in a case where the physical position of the valve element is directly detected to detect the opening speed of the shut-off valve, the number of steps may be detected by detecting the number of steps corresponding to the physical position. Thus, various techniques may be employed to detect the number of steps.

Figure 4:
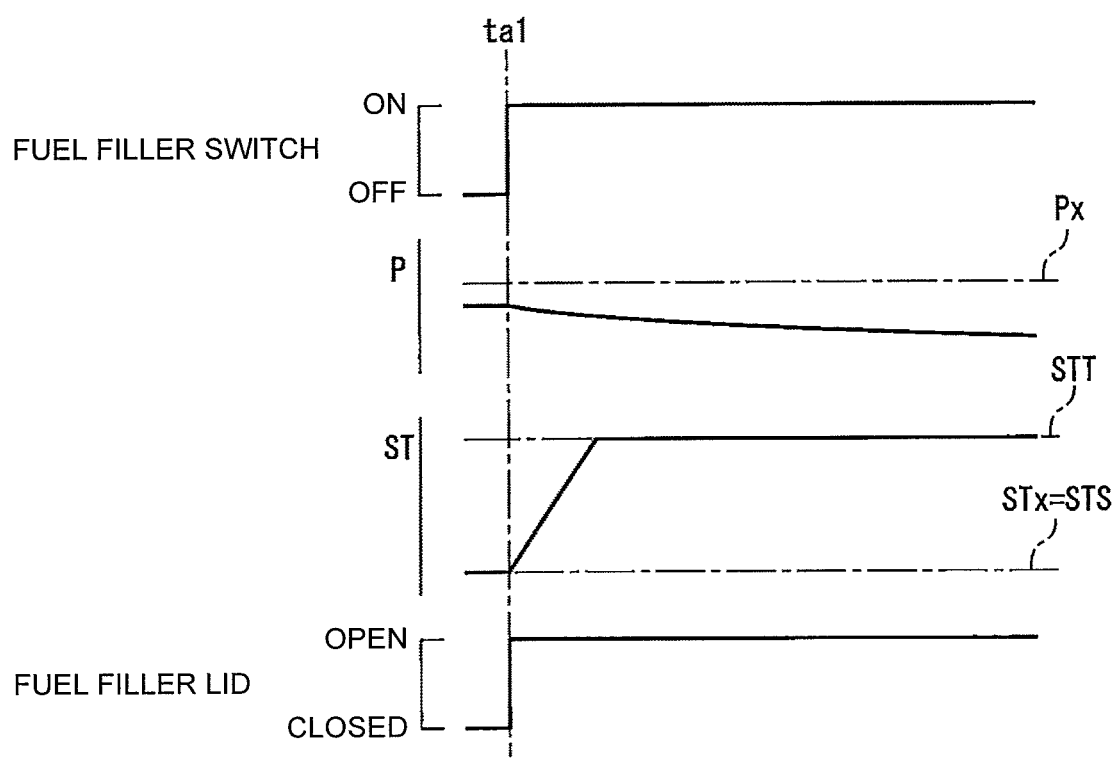
FIG. 4 is a timing chart for illustrating refueling control according to the embodiment of the disclosure.

FIG. 4 shows a case where the step increase rate VST is relatively high and, therefore, the set number of steps STx is set to a relatively small number of steps STS in the embodiment according to the disclosure. In the example shown in FIG. 4, the fuel filler switch 43 is turned on at time ta1. At time ta1, the tank pressure P is lower than or equal to the set pressure Px, and the number of steps ST is greater than or equal to the set number of steps STx. Therefore, the fuel filler lid 29 is opened at time ta1. As a result, refueling can be promptly started.

In the example shown in FIG. 4, at time ta1 or just after time ta1, the number of steps ST has not increased to a target number of steps STT. However, since the step increase rate VST is relatively high, the number of steps ST is quickly increased, and the number of steps ST has been increased to the target number of steps STT at the time when refueling is actually performed. For this reason, refueling is started in a state where the opening degree of the shut-off valve 24 is sufficiently large, and thus, refueling is smoothly performed.

Figure 5:
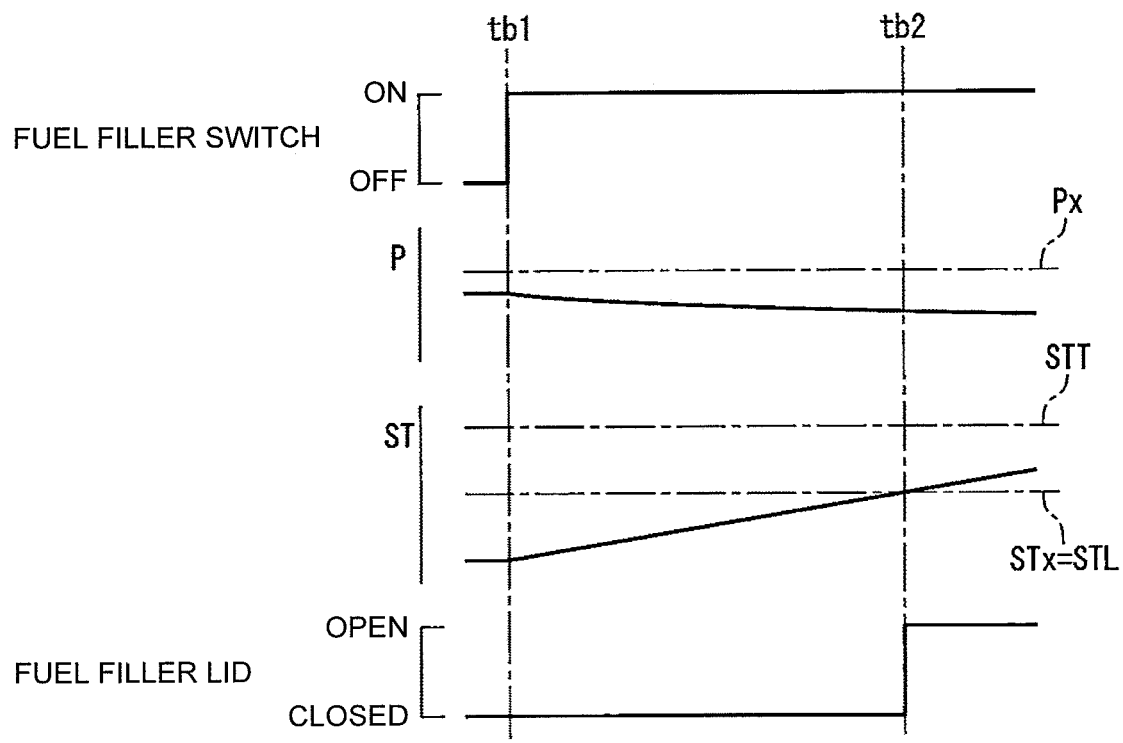
FIG. 5 is a timing chart for illustrating refueling control according to the embodiment of the disclosure.

On the other hand, FIG. 5 shows a case where the step increase rate VST is relatively low and, therefore, the set number of steps STx is set to a relatively large number of steps STL in the embodiment according to the disclosure. In the example shown in FIG. 5, the fuel filler switch 43 is turned on at time tb1. At time tb1, although the tank pressure P is lower than or equal to the set pressure Px, the number of steps ST is less than the set number of steps STx. Therefore, the fuel filler lid 29 is kept closed. Subsequently, when the number of steps ST becomes greater than or equal to the set number of steps STx at time tb2, the fuel filler lid 29 is opened. Therefore, refueling is started after the opening degree of the shut-off valve 24 is sufficiently increased, and thus, refueling is smoothly performed. In other words, not only when the opening speed of the shut-off valve 24 is high but also when the opening speed of the shut-off valve 24 is low, smooth refueling is ensured.

As is apparent from FIG. 4 and FIG. 5, in the embodiment according to the disclosure, refueling is performed when the tank pressure P is lower than or equal to the set pressure Px. For this reason, an outflow of evaporated fuel from the fuel inlet 3 is restricted when the fuel filler cap 26 is removed. During refueling, liquid fuel quickly flows into the fuel tank 2.

Figure 6:
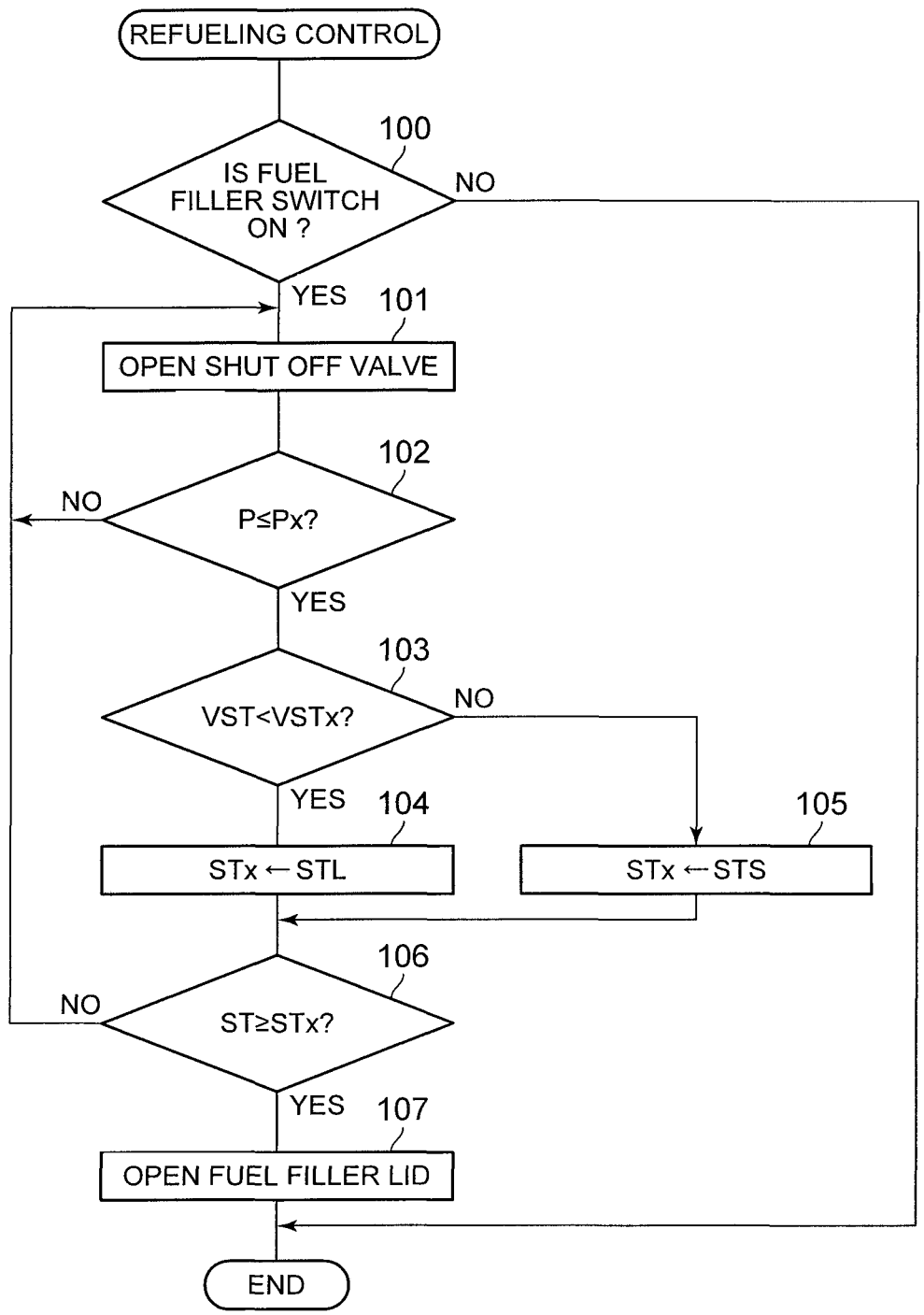
FIG. 6 is a flowchart for executing a refueling control routine according to the embodiment of the disclosure.

FIG. 6 shows a refueling control routine according to the embodiment of the disclosure. The routine is repeatedly executed at intervals of a predetermined set time (i.e., a set time that is set in advance). Referring to FIG. 6, first, in step 100, it is determined whether the fuel filler switch (SW) 43 is on. When the fuel filler switch 43 is off, the process cycle ends. When the fuel filler switch 43 is on, the process proceeds from step 100 to step 101, and the shut-off valve 24 is driven such that the number of steps ST of the step motor 24*m* is increased to the target number of steps STT. Subsequently, in step 102, it is determined whether the pressure P in the fuel tank 2 is lower than or equal to the predetermined set pressure Px. When P>Px, the process returns to step 101. When P≤Px, the process proceeds from step 102 to step 103, and it is determined whether the step increase rate VST is lower than the predetermined set rate VSTx. When VST<VSTx, the process proceeds to step 104, and the set number of steps STx is set to the relatively large set number of steps STL. After that, the process proceeds to step 106. In contrast to this, when VST≥VSTx, the process proceeds from step 103 to step 105, and the set number of steps STx is set to a relatively small set number of steps STS. After that, the process proceeds to step 106. In step 106, it is determined whether the number of steps ST of the step motor 24*m* is greater than or equal to the set number of steps STx. When ST<STx, the process returns to step 101. When ST STx, the process proceeds to step 107, and the actuator 30 is controlled such that the fuel filler lid 29 is opened.

Therefore, when the fuel filler lid is to be opened, the shut-off valve is driven such that the shut-off valve is opened to a target opening degree that is set in advance, and the fuel filler lid is closed by controlling the actuator when the opening degree of the shut-off valve is less than a set opening degree that is set in advance, and the fuel filler lid is opened by controlling the actuator when the opening degree of the shut-off valve is greater than or equal to the set opening degree. In addition, the set opening degree is set such that the set opening degree when the opening speed of the shut-off valve is low is greater than the set opening degree when the opening speed of the shut-off valve is high.

What is claimed is:
1. A refueling control system for an internal combustion engine, comprising:
 a fuel tank;
 a vapor pipe communicating with a gas region inside the fuel tank;

a shut-off valve disposed in the vapor pipe, the shut-off valve being configured to be drive by a step motor;

a fuel filler lid configured to be opened and closed by an actuator; and an electronic control unit configured to, when the fuel filler lid is to be opened, i) drive the shut-off valve such that the shut-off valve is opened to a target opening degree that is set in advance, ii) close the fuel filler lid by controlling the actuator when an opening degree of the shut-off valve is less than a set opening degree that is set in advance, and iii) open the fuel filler lid by controlling the actuator when the opening degree of the shut-off valve is greater than or equal to the set opening degree, the electronic control unit being configured to set the set opening degree such that the set opening degree when an opening speed of the shut-off valve is low is greater than the set opening degree when the opening speed of the shut-off valve is high.

2. The refuel control system according to claim 1, wherein the electronic control unit is configured to determine the opening speed of the shut-off valve based on a step increase rate that is a rate of increase in the number of steps of the step motor.

3. The refuel control system according to claim 2, wherein the electronic control unit is configured to determine the step increase rate based on a voltage of a battery.

4. The refuel control system according to claim 1, wherein the electronic control unit is configured to determine the opening speed of the shut-off valve based on a voltage of a battery.

* * * * *